US008876265B2

(12) United States Patent
Frazier et al.

(10) Patent No.: US 8,876,265 B2
(45) Date of Patent: Nov. 4, 2014

(54) INK STICK TRANSPORT SYSTEM

(75) Inventors: Isaac S. Frazier, Portland, OR (US); Brent R. Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 163 days.

(21) Appl. No.: 13/535,494

(22) Filed: Jun. 28, 2012

(65) Prior Publication Data

US 2014/0002518 A1 Jan. 2, 2014

(51) Int. Cl.
*B41J 2/17* (2006.01)
*B41J 2/175* (2006.01)
*G01D 11/00* (2006.01)

(52) U.S. Cl.
USPC .................... 347/84; 347/85; 347/88; 347/99

(58) Field of Classification Search
CPC ............................ B41J 2/17593; B41J 2/1752
USPC .................................... 347/84, 85, 86, 88, 99
See application file for complete search history.

(56) References Cited

U.S. PATENT DOCUMENTS

| | | | |
|---|---|---|---|
| 5,223,860 | A | 6/1993 | Loofbourow et al. |
| 5,442,387 | A | 8/1995 | Loofbourow et al. |
| 5,510,821 | A | 4/1996 | Jones et al. |
| 5,734,402 | A | 3/1998 | Rousseau et al. |
| 5,861,903 | A | 1/1999 | Crawford et al. |
| 6,056,394 | A | 5/2000 | Rousseau et al. |
| 6,543,867 | B1 | 4/2003 | Jones |
| 6,572,225 | B1 | 6/2003 | Jones |
| 6,679,591 | B2 | 1/2004 | Jones |
| 6,705,710 | B2 | 3/2004 | Jones et al. |
| 6,709,094 | B2 | 3/2004 | Jones |
| 6,719,413 | B2 | 4/2004 | Jones |
| 6,722,764 | B2 | 4/2004 | Jones et al. |
| 6,857,732 | B2 | 2/2005 | Jones et al. |
| 6,874,880 | B2 | 4/2005 | Jones |
| 6,893,121 | B2 | 5/2005 | Jones |
| 6,986,570 | B2 | 1/2006 | Jones et al. |
| 7,063,412 | B2 | 6/2006 | Jones et al. |
| 7,104,635 | B2 | 9/2006 | Jones |
| 7,425,061 | B2 | 9/2008 | Korn et al. |
| 7,726,798 | B2 | 6/2010 | Mattern et al. |
| 7,883,197 | B2 | 2/2011 | Mantell et al. |
| 7,971,980 | B2 | 7/2011 | Jones et al. |
| 2007/0296783 | A1 | 12/2007 | Jones et al. |
| 2008/0012916 | A1 | 1/2008 | Jones |
| 2012/0092425 | A1 | 4/2012 | Mattern et al. |

*Primary Examiner* — Jannelle M Lebron

(74) *Attorney, Agent, or Firm* — Maginot Moore & Beck LLP

(57) ABSTRACT

A solid ink stick transport system has been developed that differentiates between ink sticks inserted into a single insertion port of an inkjet printer. The system includes a solid ink support platform that moves between a position exposed outside of a printer housing to receive solid ink sticks and a position within the housing. The support includes a sensor that enables a controller to identify the solid ink stick before transporting the solid ink stick to an appropriate feed channel.

5 Claims, 6 Drawing Sheets

INK STICK TRANSPORT SYSTEM

TECHNICAL FIELD

This disclosure relates generally to imaging devices that eject ink from printheads to produce ink images on print media, and, more particularly, to imaging devices that use solid ink sticks.

BACKGROUND

Solid ink or phase change ink imaging devices, hereafter called solid ink printers, encompass various imaging devices, such as printers and multi-function devices. These printers offer many advantages over other types of image generating devices, such as laser and aqueous inkjet imaging devices. Solid ink or phase change ink printers conventionally receive ink in a solid form as pellets or as ink sticks. A color printer typically uses four colors of ink (yellow, cyan, magenta, and black).

The solid ink pellets or ink sticks, hereafter referred to as ink, sticks, or ink sticks, are delivered to a melting device, which is typically coupled to an ink loader, for conversion of the solid ink to a liquid. A typical ink loader includes multiple feed channels, one for each color of ink used in the imaging device. Each channel has an insertion opening in which ink sticks of a particular color are placed and then either gravity fed or urged by a conveyor or a spring-loaded pusher along the feed channel. Each feed channel directs the solid ink within the channel towards a melting device located at the end of the channel. Each melting device receives solid ink from the feed channel to which the melting device is connected and heats the solid ink impinging on the melting device to convert the solid ink into liquid ink that can be delivered to a print head for jetting onto a recording medium or intermediate transfer surface.

Each feed channel insertion opening may be covered by a key plate having a keyed opening. The keyed openings help ensure a printer user places ink sticks of the correct color in a feed channel. To accomplish this goal, each keyed opening has a unique shape. The ink sticks of the color corresponding to a particular feed channel have a shape corresponding to the shape of the keyed opening. The keyed openings and corresponding ink stick shapes exclude from each ink feed channel ink sticks of all colors except the ink sticks of the proper color for the feed channel. Unique keying shapes for other factors are also employed in keyed openings to exclude from a feed channel ink sticks that are formulated or intended for other printer models.

As the number of pages printed per minute increases for solid ink printers so does the demand for ink in the printer. To supply larger amounts of ink to printers, the cross-sectional area of the feed channels may be increased. Consequently, the insertion openings for the channels and the keyed plates covering the openings are likewise enlarged. These larger openings enable smaller solid ink sticks to pass through without engaging the keyed plates over the openings. Thus, solid ink sticks that do not conform to the appropriate color for a feed channel can be loaded into the feed channel and delivered to the melting device at the end of the feed channel. Even if the smaller stick is the correct color for the feed channel, its size may impair the ability of the stick to cooperate with guiding structure within the feed channel. Thus, improved ink stick loading is desirable.

SUMMARY

A more robust system for differentiating between and transporting solid ink sticks in an inkjet printer has been developed. The system includes a housing configured for a printer, the housing having an opening, an ink stick support member configured to move between a first position within the housing and a second position at least partially outside the housing, a sensor associated with the housing that generates an electrical signal indicative of a solid ink stick being positioned on the ink stick support member when the ink stick support member is in the second position, and a controller operatively connected to the sensor and to the ink stick support member, the controller being configured to operate an actuator and move the ink stick support member to the first position from the second position in response to the sensor generating the electrical signal indicative of a solid ink stick being positioned on the ink stick support member at the second position.

A method of operating a printer to provide more robust differentiation between and transportation of solid ink sticks has been developed. The method includes moving an ink stick support member from a first position within a housing of a printer to a second position outside the housing, and operating an actuator with a controller to move the ink stick support member from the second position to the first position in response to the controller receiving an electrical signal indicating a solid ink stick is on the ink stick support member.

DETAILED DESCRIPTION

Figure 1:
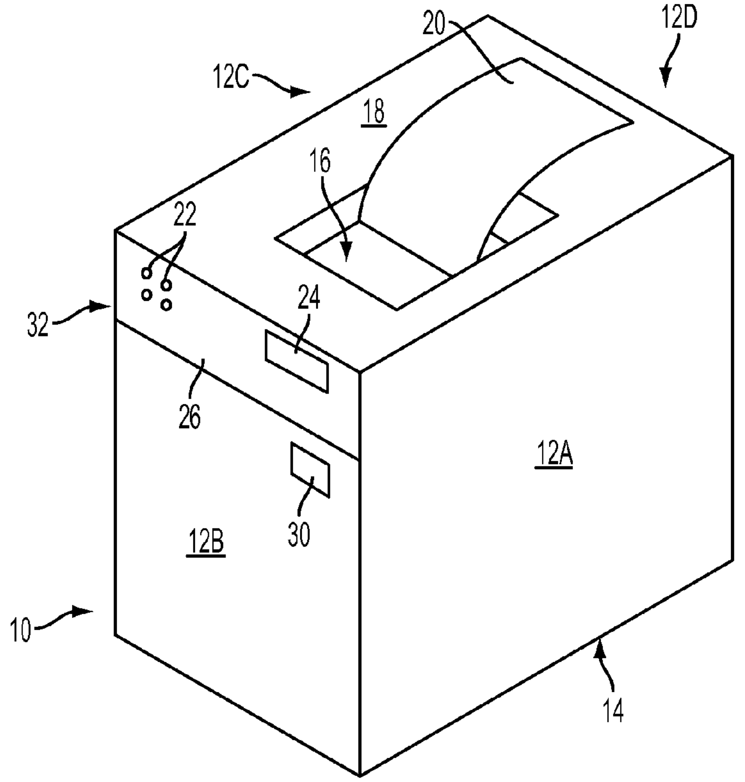
FIG. 1 is a perspective view of a solid ink printer having a system for transporting solid ink sticks.

For a general understanding of the present embodiments, reference is made to the drawings. In the drawings, like reference numerals have been used throughout to designate like elements. As used herein, the term "printer" generally refers to an apparatus that produces an ink image on print media and encompasses any apparatus, such as a digital copier, bookmaking machine, facsimile machine, multi-function machine, etc., which produces ink images on media. A printer may include a variety of other components, such as finishers, paper feeders, and the like, and may be embodied as a copier, printer, or a multifunction machine. A printer receives an image, which typically includes information in electronic form that is rendered by a marking engine for operation of inkjet ejectors in printheads to produce an ink image on print media. Such images may include text, graphics, pictures, and the like.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as a print medium or the surface of an intermediate member that carries an ink image, moves past the printheads in a process direction through the print zone. The inkjets in the printheads eject ink drops in rows in a cross-process direction, which is perpendicular to the process direction across the image receiving surface.

An exemplary solid ink printer having a solid ink transport system that moves solid ink sticks from an insertion door to a feed channel within the printer is shown in FIG. 1. The printer 10 includes a housing 32 having four vertically standing side walls 12A, 12B, 12C, and 12D, a bottom surface 14, and a top surface 18. Although the printer 10 is depicted in a shape that may be described as a rectangular solid, other shapes are possible. Additionally, the surfaces of the housing need not be smooth, but can undulate or otherwise include depressions and protrusions to accommodate internal components or enhance the visibility of external features. The housing can also include a control panel 26 having a display 24 and one or more function keys 22 or other control actuators.

The upper surface 18 of the housing 32 can include, for example, an output tray 16. Recording media, such as a paper sheet 20, exit the housing 32 and rest in the output tray 16 until retrieved by a user or operator. The housing 32 can include a media supply tray (not shown) from which recording media may be removed and processed by the printer 10. While the output tray 16 is shown as being in the upper surface 18 of the housing 32, other positions are possible, such as extending from rear wall 12D or one of the other side walls.

As shown in FIG. 1, an insertion door 30 is located in a side wall of the housing 32. Although the opening is depicted as being in the side wall 12B, it can be located in one of the other side walls, in the upper surface, or associated with an appendage to the printer. The insertion door 30 can be configured to open in response to a user command entered through the control panel 26 to enable solid ink sticks to be inserted into the printer by an operator. The door 30 is preferably configured to accept a range of different colors and types of solid ink sticks, although the opening can be sized to prevent some ink sticks from being inserted into the door 30. A sensor within the door 30 obtains identification data from each ink stick inserted in the port, enabling the door 30 to accept different colors and different types of ink sticks. These data are compared to other data stored in the printer, as described in more detail below, to identify the ink sticks. The identified ink sticks are then moved to the feed channel within the printer that corresponds to the ink stick identification, where the ink is melted and delivered to printheads for transfer to a print medium. Ink sticks not corresponding to the ink stick identification data can be ejected out of the insertion door 30 and a message can be activated to notify the operator that an inappropriate ink stick has been loaded into the port and should be removed.

Figure 2:
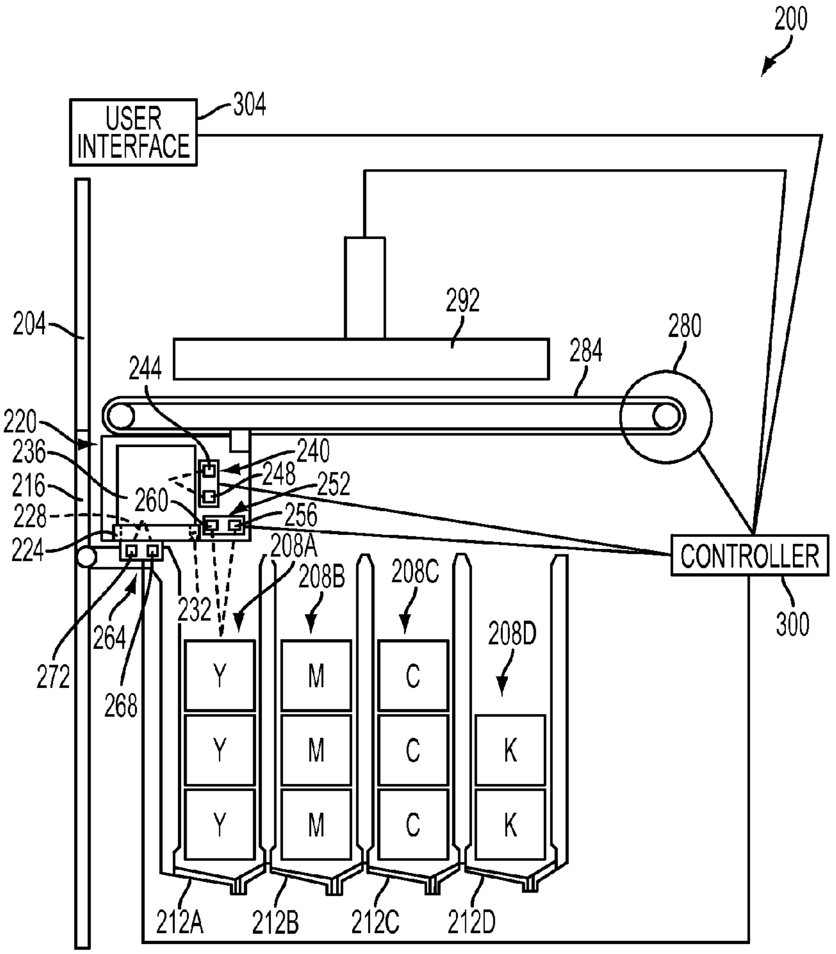
FIG. 2 is a top view of a system for transporting solid ink in a first position.

A system 200 for transporting solid ink sticks within a printer is illustrated in FIG. 2. The system 200 includes an ink stick insertion door 216, four feed channels 208A, 208B, 208C, 208D, an ink stick transport 220, a drive actuator 280, and a controller 300. The ink stick insertion door 216 is located within a printer housing 204 and is configured to open in response to a user input to enable the ink stick transport 220 to at least partially exit the printer and receive an ink stick.

The four feed channels 208A, 208B, 208C, and 208D are positioned laterally from the ink stick transport 220 as viewed from above. The ink loader and feed channels can be positioned in any orientation; however, the following descriptions are visualized in the figures with a vertical orientation. In the illustrated embodiment there are four feed channels, but in other embodiments the system can include more or less feed channels. The four feed channels 208A, 208B, 208C, and 208D are each configured to accept a different color ink stick. In the depicted embodiment, channel 208A is configured for yellow ink sticks, while channels 208B, 208C, 208D are configured to receive magenta, cyan, and black ink sticks, respectively, although other orders of the channels can be used in other embodiments. Each channel 208A, 208B, 208C, and 208D is configured to store a predetermined number of solid ink sticks to enable the printer to operate for an extended period without the need for additional ink sticks to be inserted. The feed channels 208A, 208B, 208C, and 208D terminate in melt plates 212A, 212B, 212C, and 212D, respectively. The melt plates 212A, 212B, 212C, and 212D generate heat to melt the ink sticks impinging on the melt plates 212A, 212B, 212C, and 212D. The melted ink then flows to a different ink reservoir for each color (not shown) for ejection onto a print medium or intermediate transfer surface.

The ink stick transport 220 includes a transport base 224, a transport compartment 236, an ink stick sensor 240, and a channel capacity sensor 252. The transport compartment 236 is located above the transport base 224 to partially encapsulate a solid ink stick placed on the transport base 224 and retain the ink stick in a fixed position relative to the ink stick transport 220. The transport base 224 and transport compartment 236 or their equivalents in function together form a transport support member. The transport base 224 includes a moveable retainer or gate 228 and a biasing spring 232 to enable a solid ink stick placed on the transport base 224 to rest on the moveable gate 228. In one embodiment the biasing spring 232 is a coil spring configured to exert a force on the moveable gate sufficient to support the moveable gate 224 and an ink stick resting on the moveable gate 224. Additional force supplied by an ink stick pusher 292 is sufficient to overcome the biasing spring 232 and move the moveable gate 224, enabling the ink stick to enter into a feed channel (FIG. 5). In the embodiment shown in FIG. 2 to FIG. 5, a single ink stick pusher 292 that is long enough to reach all feed channels is used. In other embodiments, the ink stick pusher can be smaller and configured to move with the ink stick transport, or a small ink stick pusher can be positioned at each feed channel to urge the ink stick through the moveable gate.

Although the embodiment shown in FIG. 2 to FIG. 5 is vertically oriented to enable the ink stick to be urged by gravity into a feed channel, other embodiments are oriented differently. For example, in a horizontal orientation, the ink stick transport base can be moved to be adjacent a horizontally oriented feed channel. A moveable gate is positioned orthogonally to the base at a position between the ink stick on the base and the feed channel insertion end. In this and similar orientations, the gate can be at the side of the ink stick and the ink stick can be resting on a base that is a different portion of the transport compartment. An ink stick pusher positioned on the side of the ink stick opposite the moveable gate is operatively connected to an actuator that is activated by a controller to urge the ink stick through the moveable gate into the insertion end of the feed channel. A biasing member closes the gate once the ink stick has left the transport base and entered the feed channel.

Ink stick sensor 240 includes an optical source 244 and an optical detector 248. The optical source 244 is configured to emit a light beam that is reflected to the optical detector 248 only when an ink stick is present in the transport compartment 236. The ink stick sensor generates a signal indicative of whether an ink stick is present in the compartment and delivers the signal to the controller 300. In alternative embodiments, a physical switch or movable flag can be used instead of or in conjunction with an optical detector. The channel capacity sensor 252 also includes an optical source 256 and an optical detector 260. Optical source 256 is aimed at the feed channels 208A, 208B, 208C, and 208D as the transport 220 passes over the channels to enable the optical source 256 to emit a beam of light into the channel over which the source 256 is positioned. The beam of light reflects off the top ink stick in the channel and the optical detector 260 receives the beam of light, generating a signal representing the distance from the sensor to the top ink stick, which is delivered to the controller 300 for determination of the number of ink sticks in the channel. In the embodiment of FIG. 2, two different sensors are used for detecting the presence of an ink stick in the transport compartment and detecting the number of ink sticks in the feed channels, although in other embodiments a single sensor can be configured to pivot between a first position and a second position. In the first position, the sensor is able to detect the presence of an ink stick in the transport compartment and, in the second position, the sensor is able to detect the number of ink sticks in one of the feed channels over which the transport is positioned. In alternative embodiments, different feed channel capacity sensors can be employed, for example, a capacitive sensor running along the length of the feed channel that is configured to be influenced by the presence of ink.

An identifying sensor 264 is located proximate to the ink stick transport 220 and is configured to identify an ink stick in the transport compartment 236. The identifying sensor 264 includes an optical source 268 and an optical detector 272. The optical source 268 emits a beam of light that is reflected from identification features on the ink stick in a manner that enables the optical detector 272 to detect a unique reflection from each type and color of ink stick. The identification features can be physical elements of the ink stick, a printed identification number, or a barcode on the ink stick. The identifying sensor 264 then generates a signal indicative of the identification data embodied in the identification features of the ink stick and delivers the signal to the controller 300. Although in the embodiment of FIG. 2 the identifying sensor 264 is positioned proximate to the ink stick transport 220, in other embodiments the identifying sensor is located on the ink stick transport to enable the sensor to identify the ink stick as the transport moves. In addition, a mechanical sensor that interacts with structural features of a solid ink stick can be used in place of an optical sensor to identify solid ink sticks having physical identification features. The identifying sensor 264, which can be configured with multiple sensors, can be implemented to identify an ink stick in a stationary position or make use of loading or transport motion to fully sense the ink stick identifying features or elements. In this case, either the sensor and/or the ink stick can be in motion as identification is made.

The drive actuator 280 is a bi-directional rotary actuator operatively connected to an endless drive belt 284 to enable the actuator 280 to move the drive belt 284 as the actuator 280 rotates. The drive belt 284 is operatively connected to the ink stick transport 220 to move the ink stick transport 220 from a position where all or a portion of the compartment 236 is outside the printer housing 204 to a position proximate one of the feed channels 208A, 208B, 208C, and 208D as the drive belt 284 moves in response to rotation of the actuator 280. Although the drive actuator is a rotary actuator in the illustrated embodiment, in other embodiments a linear actuator can be used to translate the ink stick transport from the insertion door to the feed channels, and various known connection means can be used to couple the actuator to the transport, including belts, gears, pulleys, leadscrews, and friction drive assemblies.

The controller 300 is operatively connected to and configured to send control signals to and receive data signals from the sensors 240, 252, 264, the drive actuator 280, the ink stick pusher 292, and a user interface 304. The user interface 304 can be a display operatively connected to one or more button actuators located on the outside of the printer to enable the user to input commands to the printer and receive status messages from the controller 300. The controller 300 can be the controller for the printer or a separate controller configured to operate the ink stick identification and transportation system or any other controller that operates printer component to perform any number of subsystem functions. The controller can be a general purpose processor having an associated memory in which programmed instructions are stored. Execution of the programmed instructions enables the controller to obtain data from the sensors indicating the presence of an ink stick and/or identifying the solid ink stick, to determine the number of ink sticks in each channel, and to operate the ink stick transporter to move an ink stick to the corresponding feed channel or to reject the ink stick. The controller can, alternatively, be an application specific integrated circuit or a group of electronic components configured on a printed circuit card for operation of the transport system. Thus, the controller can be implemented in hardware alone, software alone, or a combination of hardware and software.

In operation, the ink stick transport system 200 begins from a first position shown in FIG. 2, where the ink stick transport 220 is empty and ready to receive an ink stick. A user operates the user interface to signal that the user is ready to insert an ink stick in the ink stick compartment 236. Alternatively, the ink stick insertion door can be spring loaded and configured to open in response to being pressed by a user, which operates a sensor to generate a signal for delivery to the controller. The controller 300 then operates the actuator 280 to rotate and move the drive belt 284 and ink stick transport 220. As the ink stick transport 220 approaches the insertion door 216, the insertion door 216 opens. The door can be pushed open by the moving ink stick transport, or a separate actuator can open the door in response to a signal generated by the controller. The stick transport 220 and/or the transport carrier or compartment 236 or an additional component acting as the ink load positioning or set-down feature, can be configured to translate within the ink loader feed channel region but pivot outward as it moves to an ink stick load position. The ink load access/insertion door 216 may pivot in a direction complementary to translation of the carrier pivot axis or move for ink loading access in any other useful manner.

Figure 3:
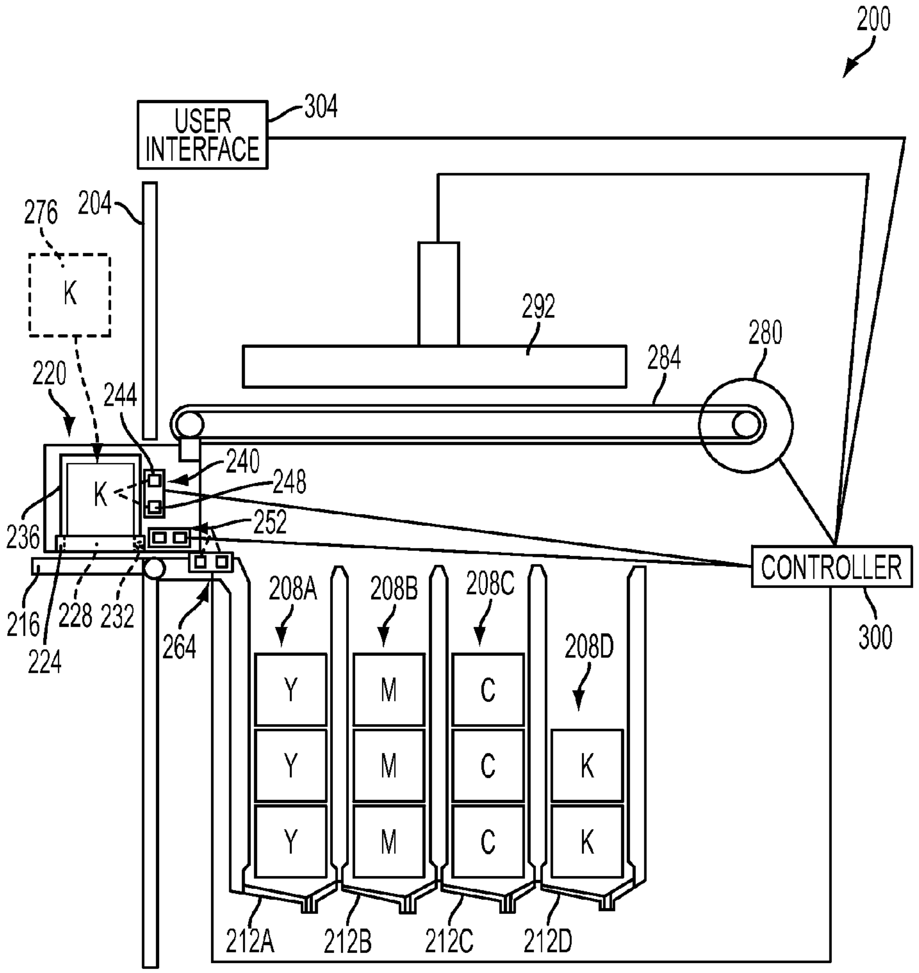
FIG. 3 is a top view of the system for transporting solid ink of FIG. 2 in a second position receiving an ink stick.

The ink stick transport 220 moves at least partially outside the printer housing 204 to a second position, shown in FIG. 3, to enable a user to place an ink stick 276 in the transport compartment 236. Once an ink stick 276 is placed in the transport compartment 236, the ink stick sensor 240 delivers a signal to the controller 300 indicating that an ink stick 276 is loaded in the transport compartment. The controller 300 operates the actuator 280 to move the ink stick transport 220 back inside the printer housing 204 and close the insertion door 216 as the ink stick transport 220 moves inside the housing 204. The insertion door can be biased by a spring to automatically close as the transport moves inside, or the insertion door can be closed by operation of an actuator. The transport 220 in the first position region, as it passes by or stops at the first position shown in FIG. 2, enables the identifying sensor 264 to sense identifying features on the ink stick 276 now loaded in the transport compartment 236 and generate an identifying signal to be delivered to the controller 300. If the controller fails to identify the ink stick 276 or identifies an improper ink stick, the controller operates the actuator 280 to return the transport 220 outside the printer housing 204 and generate an error message that is delivered to the user interface 304 to inform the user of the reason the ink stick was rejected and instructing the user to remove the ink stick 276 from the transport 220. The position of the transport compartment 236 for rejecting an ink stick is called position three herein, though the third position can be identical to the second position. The alternative third position can be a more extended or otherwise modified stop location to facilitate manual removal of the rejected ink stick.

If the sensor successfully identifies the ink stick 276 and correlates the ink stick 276 with one of the feed channels 208A, 208B, 208C, and 208D, then the controller generates a control signal to operate the actuator 280 to rotate counter-clockwise, moving the ink stick transport 220 to the feed channel corresponding to the identified ink stick 276. As the ink stick transport moves to the corresponding feed channel, the channel capacity sensor 252 senses the number of ink sticks present in each channel and generates a signal for the controller 300 that identifies the number of ink sticks in each channel. Channel capacity sensing in this fashion can be performed during motion and can be done any time the transport is in operation. As described previously, other sensing means can be employed. If a feed channel has less than a predetermined number of ink sticks, the controller 300 can instruct the user interface 304 to display a warning to insert additional ink sticks of that color. A full status for any or all of the feed channels can also be displayed or conveyed to the user so that unneeded ink stick colors are not inserted. Alternatively, if the channel corresponding to the identified ink stick 276 is full, the controller 300 reverses the operation of the actuator 280 and returns the ink stick to the position outside of the housing and indicates in the display of the user interface 304 that the feed channel for that particular color is full. In another embodiment, the controller can return the ink stick transport to the first position and wait until the feed channel corresponding to the identified ink stick is no longer full. Monitoring the loader fill capacity for each color channel can be accomplished frequently enough to indicate which of the ink colors need replenishment or which channels may have room to accept more ink ahead of any user ink loading activity. The control panel display or other indicators, such as LEDs being on or flashing, for example, could be used to signify available load capacity or a need for additional ink. This indication minimizes or eliminates the loading of ink of a particular color that cannot be accommodated due to lack of loader capacity.

Figure 4:
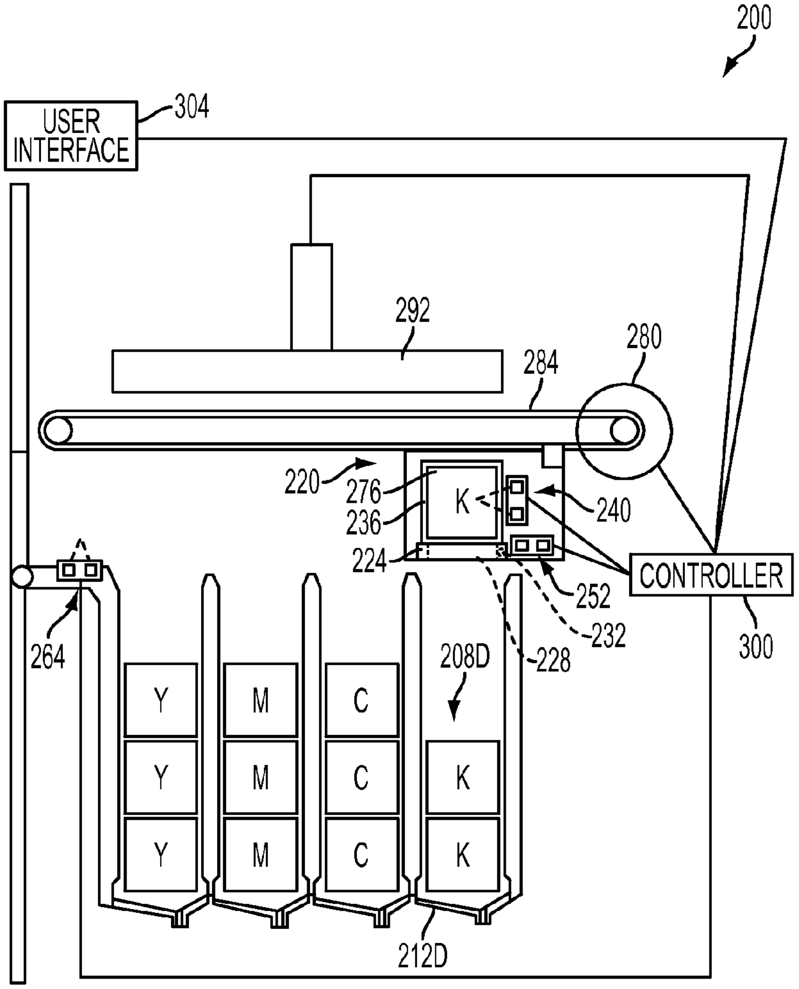
FIG. 4 is a top view of the system for transporting solid ink of FIG. 2 positioned above a feed channel.
Figure 5:
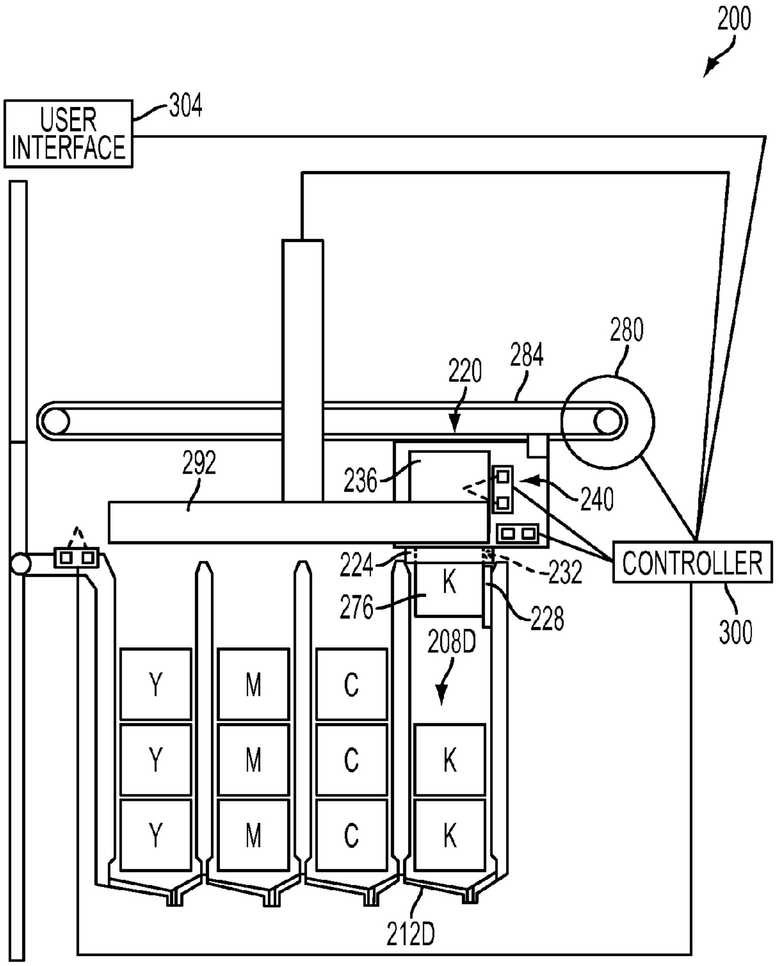
FIG. 5 is a top view of the system for transporting solid ink of FIG. 2 moving an ink stick to the feed channel.

In the embodiment shown in FIG. 3 to FIG. 5, the identified ink stick 276 is a black ink stick. The controller 300 therefore operates the actuator 280 to move the ink stick transport 220 above the black ink feed channel 208D, as shown in FIG. 4. The controller 300 generates a control signal to operate an actuator (not shown) to move the ink stick push member 292 down with force sufficient to overcome the biasing spring 232. The moveable gate 228 pivots about the biasing spring 232, enabling the ink stick 276 to pass through and into feed channel 208D, as shown in FIG. 5. The ink stick pusher 292 moves upwardly and the biasing spring pivots the moveable gate 228 back to the transport base 224. The actuator 280 returns the ink stick transport 220 to the first position and awaits additional user input. Alternative ink release actuator implementations are possible, such as using a solenoid to open a gate or using pusher force to translate rollers that move away from the ink stick laterally to enable the ink to pass beyond the carrier retention position. The ink loader example shown in FIG. 3 to FIG. 5 is suggested to be a vertical loader, where gravity may act on ink deposited in the color feed channels to carry the ink into contact with a melt device. Alternatively, the loader can be oriented at any angle where gravity may or may not assist a mechanism with ink feed. Conveyer belts, push blocks, and lead screws are a few examples of mechanisms that could be used with a loader in an orientation where gravity alone is not adequate for reliable feeding, such as a horizontal loader, for example. Additionally, the depicted single wide pusher 292 that acts to push on an ink stick at any color channel can instead be multiple narrower pushers configured to push a stick as far into the color feed channel as previously loaded sticks permit. Such a pusher arrangement can be driven independently for each color channel or can be a single pushing mechanism where each pusher is spring loaded to collectively allow full or partial channel protrusion.

Figure 6:
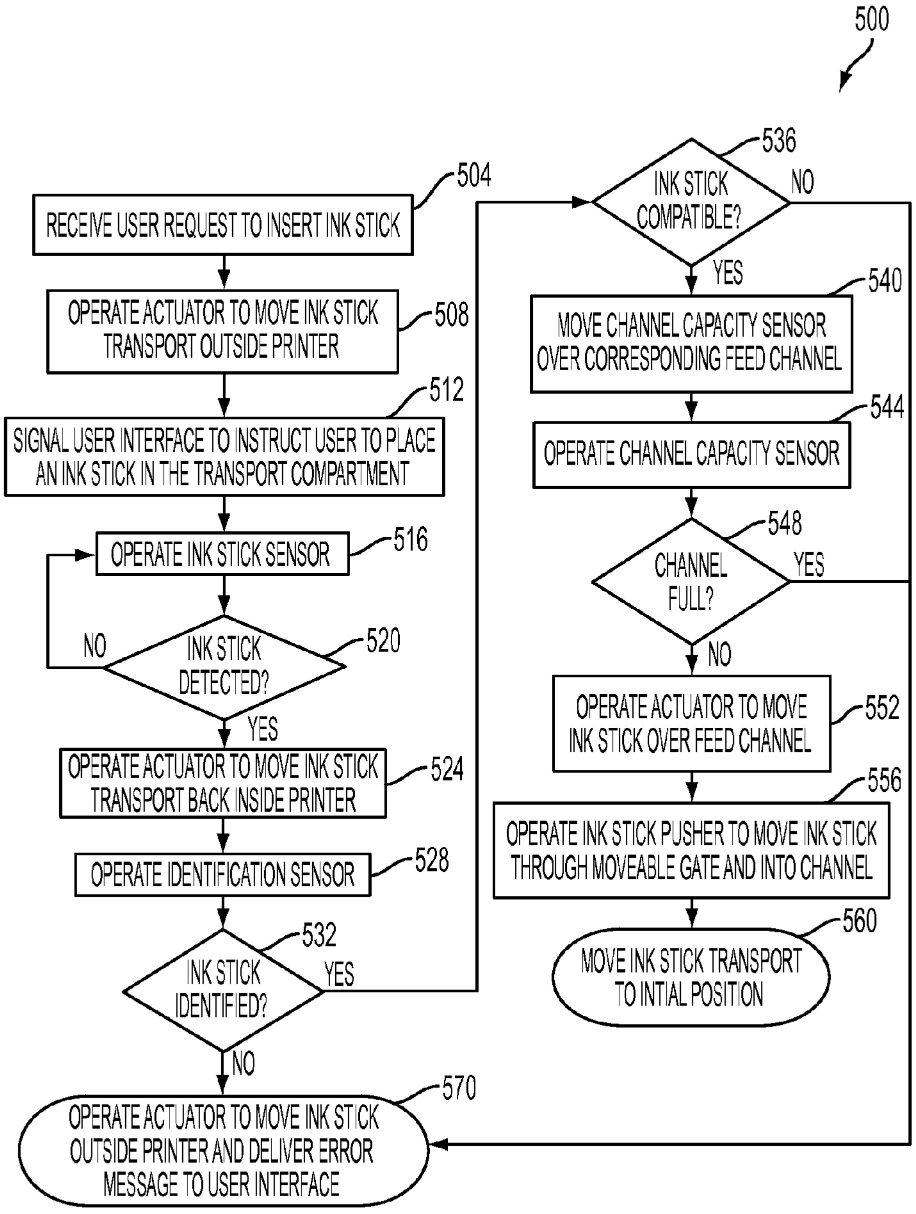
FIG. 6 is a block diagram of a process for transporting solid ink sticks.

FIG. 6 depicts a process 500 for operating an ink stick transport. As used in this document, a reference to a process performing or doing some function or event refers to a controller configured with programmed instructions stored in a memory operatively connected to the controller executing the instructions to operate electronic components operatively connected to the controller to perform the function or event. Process 500 is described with reference to the ink stick transport system 200 described above for illustrative purposes.

The process 500 begins with the controller receiving a user request to insert an ink stick (block 504). The user request can be initiated in the user interface, by pressing a button for ink stick loading, or by pressing the ink stick insertion door. Once the user request is received, the controller operates the actuator to move the ink stick transport at least partially outside the printer (block 508) to enable manual placement of an ink stick on the ink stick transport. The controller signals the user interface to display instructions to the user to place an ink stick in the transport compartment (block 512) and monitors signals from the ink stick sensor to detect the presence of an ink stick in the transport compartment (block 516). The signal to the user can be as simple as the appearance of the transport compartment. The controller continues to monitor the sensor signal until an ink stick is detected in the compartment (blocks 516, 520). When the ink stick sensor generates a signal indicating an ink stick is present in the transport compartment, the controller operates the actuator to move the ink stick transport back inside the printer (block 524). The actuator positions the transport to enable the identification sensor to sense identifying features on the ink stick (block 528). This identification can occur at a stationary position or at a position within a range of transport motion. The controller receives a signal from the identification sensor and determines if the data corresponding to the signal corresponds to ink stick identification data stored in the controller memory (block 532). If the sensor fails to identify the ink stick, the process terminates by operating the actuator to move the ink stick outside the printer and delivering an error message to the user interface indicating the reason for rejecting the ink stick (block 570).

If the sensor identifies the ink stick, the controller then determines if the identified ink stick is compatible with the printer in which the transport system is located (block 536). If the ink stick is incompatible, the process proceeds to the processing described in block 570 and terminates, ejecting the ink stick and generating an error message for the user interface. If the ink stick is compatible, the controller operates the actuator to move the transport until the channel capacity sensor is positioned proximate the feed channel corresponding to the identified ink stick (block 540). The controller then operates the channel capacity sensor to determine the number of ink sticks in the corresponding feed channel (block 544). Alternatively, the controller can have already logged the load status for the channel, in which case, retrieving this information serves the same function. The controller determines whether the channel is full (block 548), terminating the process with block 570 by ejecting the ink stick and informing the user if the channel is full. If the channel is not full, the controller operates the actuator to move the ink stick to the corresponding feed channel (block 552) and instructs the ink stick pusher to move the ink stick through the moveable gate and into the feed channel (block 556). The ink stick transport is then moved back to the initial position and the process terminates (block 560).

It will be appreciated that variants of the above-disclosed and other features and functions, or alternatives thereof, may be desirably combined into many other different systems, applications or methods. Various presently unforeseen or unanticipated alternatives, modifications, variations or improvements therein may be subsequently made by those skilled in the art which are also intended to be encompassed by the following claims.

The invention claimed is:

1. A system for transporting solid ink in a printer comprising:

a housing configured for a printer, the housing having an opening;

a plurality of feed channels within the housing, each feed channel in the plurality of feed channels having a first end and a second end;

an ink stick support member having a planar surface configured to support a single solid ink stick;

an actuator operatively connected to the ink stick support member, the actuator being configured to move the ink stick support member from a first position at least partially outside the housing to the first end of any single feed channel within the housing;

a first sensor associated with the housing that generates an electrical signal indicative of a single solid ink stick being positioned on the ink stick support member when the ink stick support member is in the first position;

a second sensor located within the housing, the second sensor being configured to generate an electrical signal that identifies a single solid ink stick on the ink stick support member; and a controller operatively connected to the first sensor, the second sensor and to the actuator, the controller being configured to operate the actuator to move the ink stick support member from the first position to a position within the housing to enable the second sensor to generate the electrical signal that identifies the single ink stick on the ink stick support member in response to the first sensor generating the electrical signal indicative of a single solid ink stick being positioned on the ink stick support member at the first position and to operate the actuator to move the ink stick support member to the first end of the feed channel corresponding to the electrical signal generated by the second sensor that identifies the single ink stick on the ink stick support member to enable the single solid ink stick to enter the feed channel and move through the feed channel to a melting device at the second end of the feed channel.

2. The system of claim 1, further comprising:

the controller being further configured to operate the actuator to move the ink stick support member to a position at least partially outside the housing in response to the electrical signal generated by the second sensor identifying the single ink stick on the ink support member as not corresponding to one of the feed channels in the plurality of feed channels to enable manual retrieval of the single ink stick from the ink stick support member.

3. The system of claim 2, the second sensor further comprising:

an optical source configured to illuminate a portion of the single solid ink stick on the ink stick support member at the first position;

an optical detector configured to receive light from the optical source that has been reflected by the single solid ink stick and to generate an electrical signal corresponding to the reflected light; and the controller being further configured to compare the electrical signal generated by the optical detector to data stored in a memory within the housing to identify the single ink stick on the ink stick support member.

4. The system of claim 2 further comprising:

a third sensor associated with the ink stick support member, the third sensor being configured to generate a plurality of electrical signals, each electrical signal generated by the third sensor being indicative of an amount of solid ink in one of the feed channels in the plurality of feed channels; and the controller being further configured to operate the actuator to move the ink stick support member to the first end at the one feed channel corresponding to the electrical signal generated by the second sensor that identifies the single ink stick on the ink stick support member in response to the third sensor generating an electrical signal indicating the one feed channel corresponding to the electrical signal generated by the second sensor as being less than full.

5. The system of claim 4, the controller being further configured to operate the actuator to move the ink stick support member to the first position or hold the ink stick support member at the position where the second sensor generates the electrical signal that identifies the single ink stick on the ink stick support member in response to the third sensor generating an electrical signal indicating the feed channel corresponding to the electrical signal generated by the second sensor as being full.

* * * * *